United States Patent [19]

Iwata et al.

[11] 4,340,113

[45] Jul. 20, 1982

[54] ELECTRIC CONTROL METHOD AND APPARATUS FOR AUTOMOBILE AIR CONDITIONING SYSTEM

[75] Inventors: Yasuhiro Iwata, Aichi; Kiyoshi Usami, Obu; Teiichi Nabeta, Okazaki; Masanori Naganoma, Kariya; Yasuhumi Kojima, Gifu, all of Japan

[73] Assignee: Nippondenso Co., Ltd., Kariya, Japan

[21] Appl. No.: 58,383

[22] Filed: Jul. 17, 1979

[30] Foreign Application Priority Data

Jul. 18, 1978 [JP] Japan .................................. 53-87908

[51] Int. Cl.³ .................... F28F 27/00; F25B 29/00; B60H 3/00
[52] U.S. Cl. .................................. 165/25; 62/244; 165/28; 165/30; 165/43
[58] Field of Search .................. 165/25, 27, 28, 30, 165/43, 42; 62/243, 244

[56] References Cited

U.S. PATENT DOCUMENTS

| | | | |
|---|---|---|---|
| 2,829,869 | 4/1958 | Philipp | 165/43 |
| 3,004,752 | 10/1961 | Armes et al. | 165/28 |
| 3,686,891 | 8/1972 | Wills | 62/244 X |
| 3,771,593 | 11/1973 | Shepheard | 165/43 |
| 4,037,651 | 7/1977 | Ito et al. | 165/30 |
| 4,147,205 | 4/1979 | Bata et al. | 165/43 X |

FOREIGN PATENT DOCUMENTS

2445590 3/1975 Fed. Rep. of Germany ........ 165/43

*Primary Examiner*—Sheldon J. Richter
*Attorney, Agent, or Firm*—Cushman, Darby & Cushman

[57] ABSTRACT

In an electric control method and apparatus for an automobile air conditioning system, an air-blend door is arranged between an evaporator and a heater within an air duct to control an amount of the cooled air flowing through the heater into a passenger compartment and to control an amount of the cooled air directly flowing into the compartment, and a refrigerant compressor for the evaporator is connected to a prime mover of the automobile when the air-blend door is opened to allow the cooled air flowing through the heater in a limited range and is disconnected from the prime mover when the air-blend door is further opened to allow the cooled air flowing through the heater beyond the limited range.

4 Claims, 2 Drawing Figures

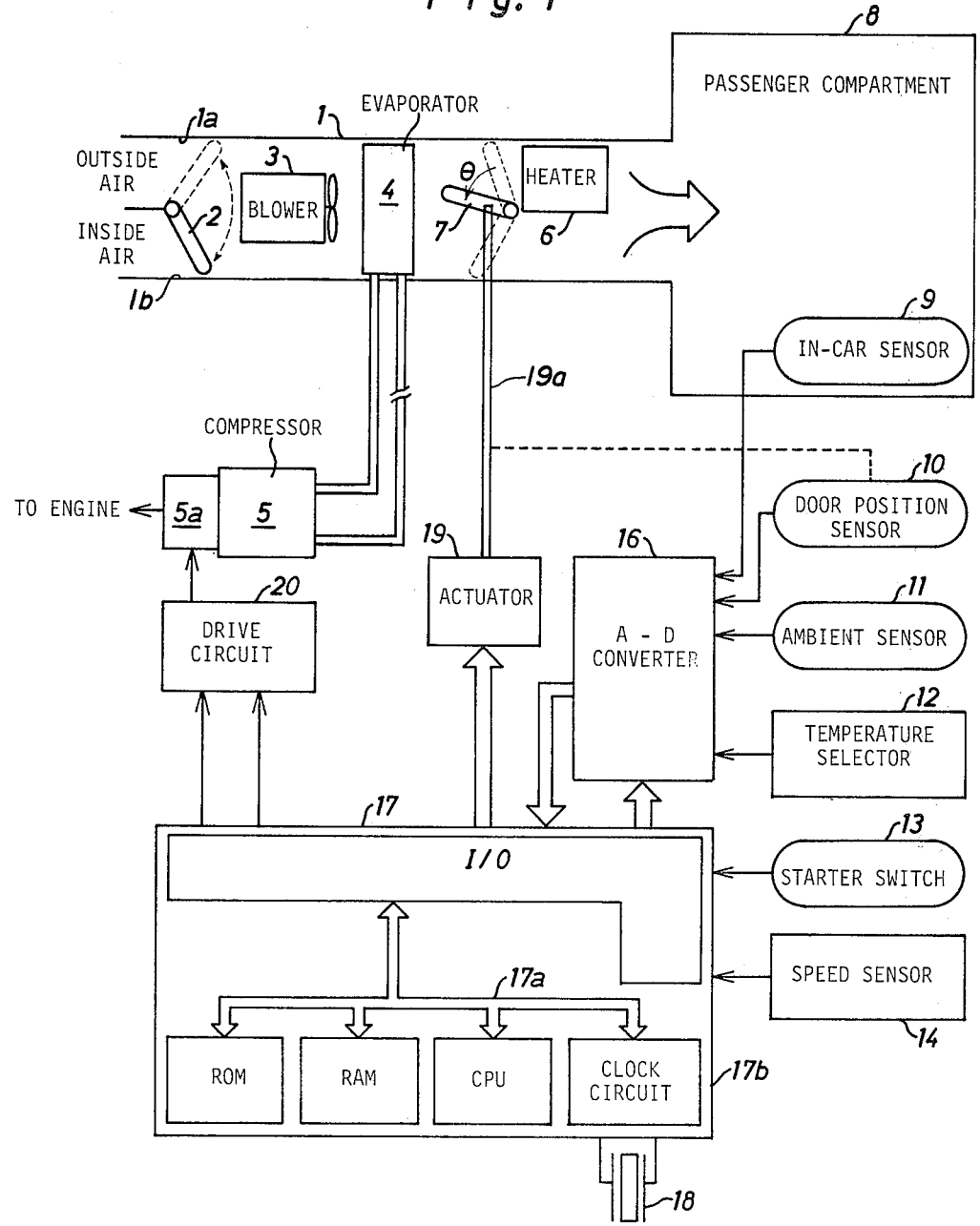

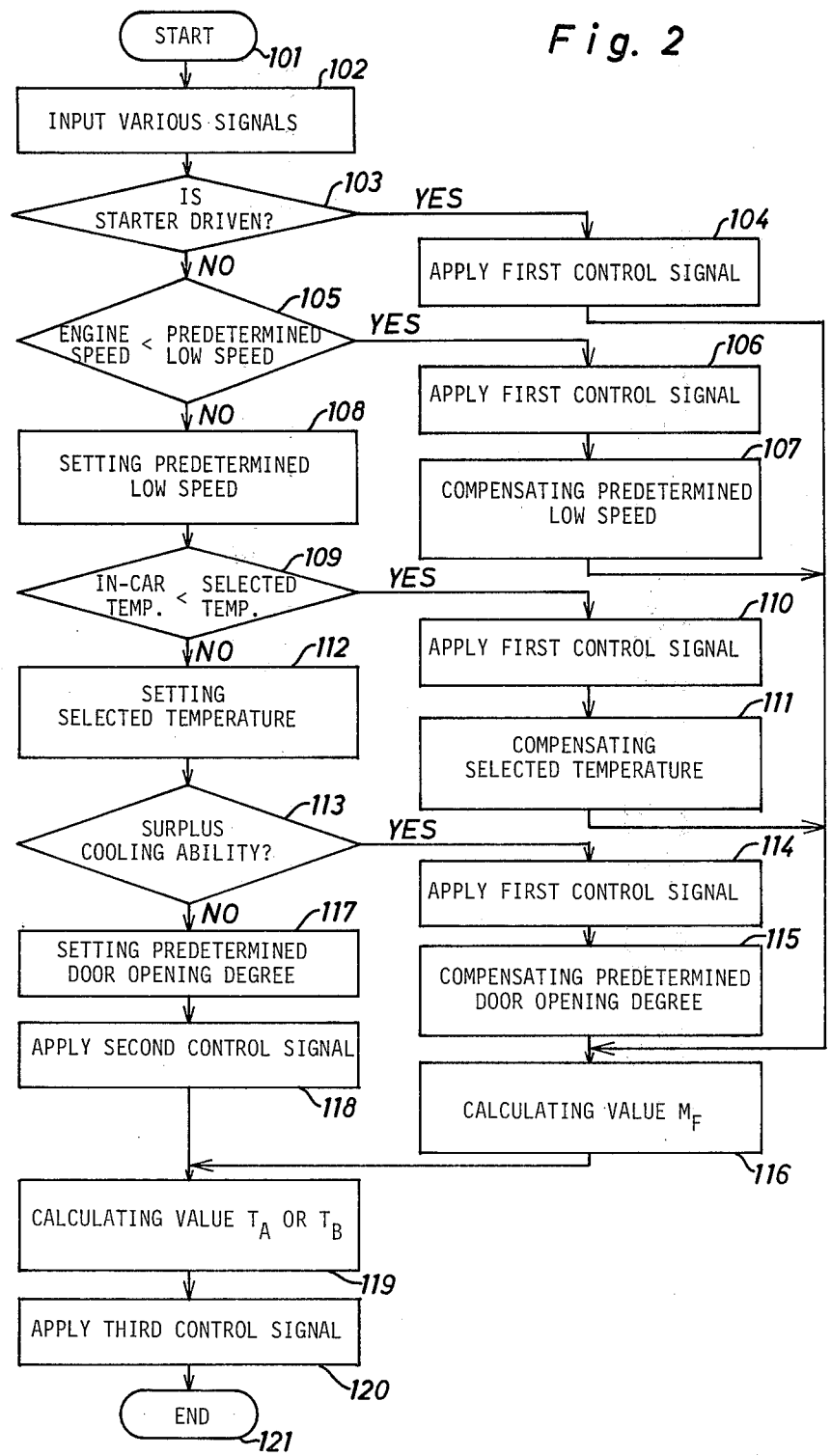

4,340,113

ELECTRIC CONTROL METHOD AND APPARATUS FOR AUTOMOBILE AIR CONDITIONING SYSTEM

BACKGROUND OF THE INVENTION

The present invention relates to a control method and apparatus for an automobile air conditioning system, and more particularly to an electric control method and apparatus for an automobile air conditioning system in which an electromagnetic clutch mechanism is provided to connect a refrigerant compressor for an evaporator with a prime mover of the automobile.

In such a conventional electric control apparatus, it is desirable that while cooling ability of the air conditioning system is only partly utilized to condition the air in a passenger compartment of the automobile, the clutch mechanism is deenergized to disconnect the compressor from the prime mover so as to avoid undesired output power losses of the prime mover during travel of the automobile.

SUMMARY OF THE INVENTION

It is, therefore, a primary object of the present invention to provide an electric control method and apparatus in which a computer is provided to discriminate the rate of cooling ability of the air conditioning system utilized to condition the air in the passenger compartment.

It is another object of the present invention to provide an electric control method and apparatus, having the above-mentioned characteristics, in which an air-blend door is arranged between an evaporator and a heater within an air duct to control an amount of the cooled air flowing through the heater into the passenger compartment and to control an amount of the cooled air directly flowing into the compartment, and in which a refrigerant compressor for the evaporator is connected to a prime mover of the automobile when the air-blend door is opened to allow the cooled air flowing through the heater in a limited range and is disconnected from the prime mover when the air-blend door is further opened to allow the cooled air flowing through the heater beyond the limited range.

According to the present invention, there is provided an electric control apparatus for an automobile air conditioning system including an air duct for allowing the flow of air into a passenger compartment of the automobile, an evaporator connected with a refrigerant compressor and arranged within the air duct for cooling the air flowing therethrough, a heater arranged for warming a portion of the cooled air flowing from the evaporator into the compartment therethrough, an air-blend door arranged between the evaporator and the heater for controlling an amount of the cooled air flowing into the heater and controling an amount of the cooled air directly flowing into the compartment, an electrically operated clutch mechanism for connecting the compressor to a prime mover of the automobile upon energization thereof and for disconnecting the compressor from the prime mover upon deenergization thereof, and an actuator for controlling the opening degree of the air-blend door to maintain the actual temperature of air in the compartment in a desired value, the control apparatus comprising:

first means for producing a first electric binary signal indicative of the actual temperature of air in the compartment;

second means for producing a second electric binary signal indicative of the actual temperature of air outside the automobile;

third means for producing a third electric binary signal indicative of the opening degree of the air-blend door;

a digital computer programmed to discriminate whether or not the opening degree of the air-blend door is in a predetermined value, the predetermined value being measured from a reference position of the air-blend door in which the cooled air from the evaporator is fully blocked from the heater, the computer producing a first control signal when a value of the third binary signal is above the predetermined value and a second control signal when a value of the third binary signal is below the predetermined value, the computer being further programmed to calculate a value indicative of optimum opening degree of the air-blend door maintaining the desired temperature of air in the compartment in relation to the actual temperatures of air in the compartment and outside the automobile and for producing a third control signal indicative of the calculated value to be applied to the actuator; and fourth means for deenergizing the clutch mechanism in response to the first control signal from the computer and for energizing the clutch mechanism in response to the second control signal from the computer.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 is a schematic block diagram of an electric control apparatus in accordance with the present invention adapted to an automobile air conditioning system; and FIG. 2 is a flow diagram illustrating operation of the digital computer shown in block form in FIG. 1.

DESCRIPTION OF THE PREFERRED EMBODIMENT

Referring now to FIG. 1 of the drawings, there is illustrated an electric control apparatus for an automobile air conditioning system in accordance with the present invention. The air conditioning system comprises an air duct 1 which is provided therein with a switch door 2, a blower 3 and an evaporator 4. The switch door 2 is manually switched over to selectively open first and second inlets 1a, 1b of the air duct 1, as shown by solid and dotted lines in FIG. 1. When the first inlet 1a is opened, the air to be conditioned is taken from outside the automobile into the air duct 1. When the second inlet 1b is opened, the air to be conditioned is taken from inside a passenger compartment 8 of the automobile into the air duct 1. The blowwer 3 receives electric power supply from a battery by actuation of a blower switch such that it is driven to impel the air from one of inlets 1a, 1b toward the evaporator 4. When the evaporator 4 receives the air from the blower 3, refrigerant liquid in the evaporator 4 is evaporated by heat of the air to extract heat from the air. The heat-extracted or cooled air is dehumidified and applied by evaporator 4 to an air-blend door 7, whereas the evaporated liquid is circulated into a refrigerant compressor 5 as refrigerant gases. The compressor 5 includes an electromagnetic clutch 5a which is coupled to an engine for the automobile. The clutch 5a is selectively energized by operation of the electric control apparatus, as described below, to connect the compressor 5 with the engine. When the compressor 5 is driven by the engine, the refrigerant gases are compressed by the compressor 5 into high-pressurized ones and condensed by a condesor into high-pressurized refrigerant liquid. The refrigerant liquid from the condenser is changed by an expansion valve into low-pressurized refrigerant liquid with low temperature to be circulated into the evaporator 4.

The air-blend door 7 is provided within the air duct 1 and coupled by an operating rod 19a to an actuator 19. The actuator 19 is an electrically operated vacuum actuator having a well-known construction and serves to displace the rod 19a by operation of the electric control apparatus, as described below, to control an opening degree $\theta$ of the air-blend door 7 in an optimum value. Thus, the cooled air from the evaporator 4 is partly applied to and warmed by a heater 6 in accordance with the opening degree $\theta$ of the door 7 and flows into the passenger compartment 8, and the remaining cooled air flows directly into the compartment 8. This means that the proportion of the warm and cold air is controlled by the air-blend door 7 to maintain temperature of air in the compartment 8 in a desired value. In this case, when the door 7 is positioned at the opening degree $\theta$ of a zero value, all the cooled air from the evaporator 4 directly flows into the compartment 8. This means that the maximum cooling ability of the air conditioning system is utilized to condition the air in the compartment 8. When the door 7 is positioned at the opening degree of a maximum value, all the cooled air is warmed by the heater 6 and supplied into the compartment 8 as the warmed air. This means that the minimum cooling ability of the air conditioning system is only utilized to condition the air in the compartment 8.

From the above description, it should be noted that the maximum surplus cooling ability of the air conditioning system is defined as the difference between the maximum and minimum cooling abilities and that surplus cooling ability of the air conditioning system decreases in accordance with decrease of the opening degree $\theta$ of the door 7. In addition, the heater 6 receives heat energy of water in the engine coolant system to warm the cold air from evapolator 4.

The electric control apparatus comprises an analog-to-digital converter 16 connected to sensors 9, 10, 11 and a temperature selector 12. The in-car sensor 9 is provided within the passenger compartment 8 such that it detects instant temperature $T_{in}$ of air in the compartment 8 to produce an electric signal indicative of the instant in-car temperature $T_{in}$. The outside ambient sensor 11 is located near the condenser to detect instant ambient temperature $T_{am}$ outside the automobile so as to produce an electric signal indicative of the instant ambient temperature $T_{am}$. The door position sensor 10 is a potentiometer coupled to the operating rod 19a of the actuator 19. The potentiometer detects displacement of the rod 19a to produce an electric signal indicative of the instant opening degree $\theta$ of the air-blend door 7. The temperature selector 12 is provided within the passenger compartment 8 and serves to manually select in-car temperature in a desired value to produce an electric signal indicative of the selected in-car temperature. All the electric signals from the sensors 9, 10, 11 and temperature selector 12 are respectively applied to and converted by the converter 16 into electric binary signals.

The electric control apparatus also comprises a digital computer 17 connected to a starter switch 13, a speed sensor 14 and the converter 16. Each of the binary signals from the converter 16 is applied to the computer 17 when required by the computer 17. The starter switch 13 is provided within an ignition switch in the form of a manually operable switch for the engine. When the ignition switch is actuated, the starter switch 13 is temporarily closed to produce an electric signal indicative of driving a starter motor for the engine. The speed sensor 14 is provided on the engine to produce an electric pulse signal with a frequency corresponding with rotational speed of the engine. The electric signals from the starter switch 13 and speed sensor 14 are respectively applied to the digital computer 17.

The digital computer 17 is a single chip LSI microcomputer and serves to receive a constant voltage from a voltage stabilizer so as to be ready for its operation. The voltage stabilizer receives the electric power supply from the battery by actuation of the ignition switch to produce the constant voltage therefrom. The digital computer 17 comprises a central processing unit or CPU which is connected to an input-output device or I/O through a data bus 17a. CPU is also connected through data bus 17a to a clock circuit 17b, a read only memory or ROM, and a random access memory or RAM. I/O receives the binary signals from converter 16 and the electric signal from starter switch 13 to temporarily memorize them in RAM. These memorized signals are selectively read out and applied to CPU through data bus 17a. CPU serves to execute a predetermined computer program in accordance with clock signals from the clock circuit 17b. The clock circuit 17b is cooperable with a crystal oscillator 18 to produce the clock signals at a predetermined frequency.

The predetermined program is previously stored in ROM to be executed in the computer 17 as in the followings.

(1) A value indicative of the rotational speed of the engine is calculated by CPU in accordance with the pulse signal having the engine speed frequency from I/O, the calculated value being temporarily stored in RAM.

(2) Reading out the electric signal indicative of driving the starter motor from RAM, CPU discriminates the fact that the starter motor is driven and produces a first control signal indicative of deactivation of the compressor 5 therefrom.

(3) Reading out the above-noted calculated value and a value indicative of a predetermined low rotational speed of the engine respectively from RAM and ROM, CPU discriminates as to whether or not the calculated engine speed value is lower than the predetermined engine low speed value. When the calculated engine speed value is lower than the predetermined engine low speed value, CPU produces the first control signal therefrom. Thereafter, the predetermined engine low speed value is compensated in CPU such that it takes a higher value by a predetermined compensation engine speed value to be temporarily memorized in RAM as the compensated engine low speed value. When the calculated engine speed value is higher than the compensated engine low speed value, the latter is cancelled by CPU, and the predetermined engine low speed value is again set for the next execution in computer 17. In addition, the predetermined engine low speed value is experimentally determined as a maximum idling speed of the engine and previously stored in ROM. The predetermined compensation engine speed value is also previously stored in ROM and used to provide hysteresis for preventing oscillation in operation of the electric control apparatus.

(4) Reading out the binary signals respectively indicative of the instant and selected in-car temperatures from RAM, CPU discriminates as to whether or not the instant in-car temperature is lower than the selected in-car temperature. When the instant in-car temperature is lower than the selected in-car temperature, CPU produces the first control signal therefrom. Thereafter, the selected in-car temperature is compensated in CPU such that it takes a higher value by a predetermined compensation temperature value to be memorized in RAM as the compensated selected in-car temperature. When the instant in-car temperature is higher than the compensated selected in-car temperature, the latter is cancelled by CPU, and the selected in-car temperature is again set for the next execution in computer 17.

(5) Reading out the binary signal indicative of the instant door opening degree $\theta$ from RAM and a value indicative of a predetermined opening degree of air-blend door 7 from ROM, CPU discriminates as to whether or not the instant door opening degree is larger than the predetermined door opening degree. When the instant door opening degree is larger than the predetermined door opening degree, CPU produces the first control signal therefrom. Thereafter, the predetermined door opening degree is compensated in CPU such that it takes a smaller value by a predetermined compensation door opening degree to be memorized in RAM as the compensated door opening degree. When the instant door opening degree is smaller than the compensated door opening degree, the latter is cancelled by CPU, and the predetermined door opening degree is again set for the next execution in computer 17. Thereafter, CPU produces a second control signal indicative of activation of compressor 5 therefrom. In addition, the predetermined door opening degree is experimentally determined to be larger than the door opening degree of the zero value and is previously memorized in ROM. The predetermined compensation door opening degree is also memorized in ROM and used to provide hysteresis for preventing oscillation in operation of the electric control apparatus.

(6) After produced the first control signal, CPU calculates a value $M_F$ from the following equation (1) in accordance with the binary signal indicative of the ambient temperature $T_{am}$ from RAM and a first temperature coefficient $K_1$.

$$M_F = K_1 \cdot T_{am} \qquad \ldots (1)$$

The first temperature coefficient $K_1$ is experimentally determined in consideration with ambient temperature outside the automobile under deactivation of the compressor 5. The temperature coefficient $K_1$ and equation (1) are previously memorized in ROM. Furthermore, CPU calculates a value $T_A$ from the following equation (2) in accordance with the calculated value $M_F$, the binary signals respectively indicative of the instant in-car and ambient temperatures $T_{in}$, $T_{am}$ and door opening degree $\theta$ from RAM and second to fourth temperature coefficients $K_2$, $K_3$, $K_4$. Then, CPU produces a third control signal indicative of the calculated value $T_A$ such that the actuator 14 controls the door opening degree $\theta$ in an optimum value.

$$T_A = K_2 \cdot T_{in} + K_3 \cdot T_{am} + K_4 \cdot \theta + M_F \qquad \ldots (2)$$

In this case, the value $T_A$ indicates optimum temperature corresponding with an optimum opening degree of the door 7 under deactivation of the compressor 5. The second and third temperature coefficients $K_2$, $K_3$ are experimentally determined respectively in consideration with in-car and outside ambient temperatures. The fourth temperature coefficient $K_4$ is experimentally determined in consideration with temperature corresponding with the instant door opening degree $\theta$. The second to fourth temperature coefficients $K_2$, $K_3$, $K_4$ and equation (2) are previously stored in ROM.

(7) After produced the second control signal, CPU calculates a value $T_B$ from the following equation (3) in accordance wth the temperature coefficients $K_2$, $K_3$, $K_4$ from ROM and the binary signals indicative of the instant in-car and ambient temperatures $T_{in}$, $T_{am}$ and door opening degree $\theta$ from RAM. Then, CPU produces a third control signal indicative of the calculated value $T_B$ such that the actuator 19 controls the door opening degree $\theta$ in an optimum value.

$$T_B = K_2 \cdot T_{in} + K_3 \cdot T_{am} + K_4 \cdot \theta \qquad \ldots (3)$$

In this case, the value $T_B$ indicates optimum temperature corresponding with an optimum opening degree of door 7 under activation of the compressor 5. In practice of the present invention, a microcomputer of 8048 type manufactured by INTEL CORP. has been used as the computer 17 due to its commercial availability. Detail description regarding the microcomputer is eliminated because the particular construction and programming process are well known in prior arts.

A drive circuit 20 receives the first control signal from computer 17 such that it produces an electric deenergization signal to deenergize the clutch 5a. The drive circuit 20 also receives the second control signal from computer 17 such that it produces an electric energization signal to energize the clutch 5a.

Hereinafter, operational mode of the above embodiment will be described in detail with reference to a flow diagram shown in FIG. 2. When the ignition switch is actuated to connect the voltage stabilizer to the battery, the computer 17 is ready for its operation upon receiving the constant voltage from the stabilizer. Then, the computer program is initiated at a point 101 according to the flow diagram and proceeds to a point 102. When the ignition switch is further actuated to temporarily close the starter switch 13, the starter motor is driven to crank the engine, and an electric signal indicative of driving the starter motor is produced from the starter switch 13. The cranking of the engine is also detected by and produced from the speed sensor 14 as an electric pulse signal with a frequency corresponding to cranking speed of the engine. The electric signals from the starter switch 13 and speed sensor 14 are respectively applied to I/O, the former being memorized in RAM by I/O. Then, CPU calculates a value indicative of cranking speed of the engine in accordance with the pulse signal with the engine cranking speed frequency from I/O, the calculated value being temporarily memorized in RAM.

Furthermore, instant in-car temperature $T_{in}$ in the passenger compartment 8 is detected by and produced from the in-car sensor 9 as an electric signal indicative of the instant in-car temperature $T_{in}$, and instant ambient temperature $T_{am}$ outside the automobile is detected by and produced from the ambient sensor 11 as an electric signal indicative of the instant ambient temperature $T_{am}$. An instant opening degree $\theta$ of the air-blend door 7 is detected by and produced from the door position sensor 10 as an electric signal indicative of the instant door opening degree $\theta$. When at ths stage a desired in-car temperature is manually selected by the temperature selector 12, an electric signal indicative of the selected in-car temperature is produced from the selector 12. The electric signals from the sensors 9, 10, 11 and selector 12 are respectively converted by the converter 16 and applied to the computer 17 as electric binary signals. The binary signals from the converter 16 are respectively applied to and temporarily memorized in RAM.

When the computer program proceeds to the following point 103, CPU reads out the electric signal indicative of driving the starter motor from RAM and thereafter discriminates as "yes", the program proceeding to a point 104. Then, a first control signal is produced from CPU on a basis of the discriminated result at a point 103 and is applied to the drive circuit 20. Subsequently, an electric deenergization signal is produced from the drive circuit 20 in response to the first control signal from computer 17 and is applied to the electromagnetic clutch 5a. When the clutch 5a is deenergized due to the electric deenergization signal, it is disengaged to disconnect the compressor 5 from the engine.

When the computer program proceeds to a point 116, the binary signal indicative of the ambient temperature $T_{am}$ is read out from RAM, and the first temperature coefficient $K_1$ is read out from ROM. Then, CPU calculates a value $M_F$ from the equation (1) in accordance with the temperature $T_{am}$ and coefficient $K_1$ and proceeds the program to the following point 119. At this point 119, the binary signals respectively indicative of the in-car temperature $T_{in}$, ambient temperature $T_{am}$ and door opening degree $\theta$ are respectively read out from RAM, and the second to fourth temperature coefficients $K_2$, $K_3$, $K_4$ are respectively read out from ROM. Then, CPU calculates a value $T_A$ from the equation (2) in accordance with the calculated value $M_F$, in-car and ambient temperatures $T_{in}$, $T_{am}$, door opening degree $\theta$ and coefficients $K_2$, $K_3$, $K_4$. Thereafter, the computer program proceeds to points 120, 121, and the calculated value $T_A$ from CPU is applied to the actuator 19 as a third control signal. Thus, the actuator 19 is actuated such that the operating rod 19a is displaced to control the opening degree of the air-blend door 7 toward a zero value.

From the above description, it will be noted that during cranking of the engine, the above execution in computer 17 is repetitively conducted to control the door opening degree toward the zero value and to maintain deactivation of the compressor 5 so as to utilize electric power of the battery for effectively driving the starter motor.

When the engine is started due to completion of the cranking during the above repetitive execution in computer 17, the electric signal from the starter switch 13 disappears, and an electric pulse signal with a frequency corresponding to the idle speed of the engine is produced from the speed sensor 14. The electric signal from speed sensor 14 is applied to I/O of computer 17 together with electric binary signals from the converter 16 at point 102. Then, CPU calculates a value indicative of idling speed of the engine in accordance with the pulse signal having the idling speed frequency from I/O, the calculated value being memorized in RAM temporarily.

When the computer program proceeds to point 103, CPU discriminates as "no" because any electric signal from the starter switch 13 is not memorized in RAM, and proceeds the computer program to the following point 105. Then, the predetermined low speed value and the calculated idling speed value are respectively read out from ROM and RAM, and CPU discriminates as "yes" because the calculated idling speed value is lower than the predetermined low speed value. This proceeds the computer program to the following point 106. When a first control signal is produced from CPU on a basis of the discriminated result at point 105, the drive circuit 20 generates an electric deenergization signal in response to the first control signal. Thus, disengagement of the clutch 5a is still held to maintain deactivation of the compressor 5, as previously described. At this stage, the heater 6 starts to receive heat energy of water circulated from the engine coolant system.

When the computer program proceeds to a point 107, the predetermined compensation speed value is read out from ROM, and the predetermined low speed value is compensated by CPU such that it takes a higher value by the predetermined compensated speed value. This provides hysteresis in the electric control apparatus for preventing oscillation between the point 106 and a point 108 in the computer program. The compensated low speed value is temporarily memorized in RAM, and the program proceeds to point 116. Then, CPU calculates a value $M_F$ from the equation (1) in accordance with the first temperature coefficient $K_1$ from ROM and a binary signal indicative of ambient temperature $T_{am}$ from RAM. Thereafter, at point 119, CPU also calculates a value $T_A$ from the equation (2) in accordance with the calculated value $M_F$, in-car and ambient temperature $T_{in}$, $T_{am}$, door opening degree $\theta$, and second to fourth temperature coefficents $K_2$, $K_3$, $K_4$. When the calculated value $T_A$ is applied to the actuator 19 from CPU as a third control signal, the actuator 19 is actuated to displace the operating rod 19a such that the opening degree of air-blend door 7 approaches to the zero value.

From the above description, it will be noted that during idle of the engine, the above execution in computer 17 is repetitively conducted to approach the door opening degree to the zero and to maintain deactivation of the compressor 5.

When the vehicle starts to travel during the above repetitive execution, rotational speed of the engine is increased, and an electric pulse signal with a frequency corresponding to the increased rotational speed of the engine is produced from the speed sensor 14. The electric signal from speed sensor 14 is applied to I/O of computer 17 together with binary signals from the converter 16 at point 102. Then, CPU calculates a value indicative of rotational speed of the engine in accordance with the pulse signal having the increased engine speed frequency from I/O. Thereafter, the computer program proceeds to point 105 through point 103, and CPU discriminates as "no" because the calculated increased speed value is higher than the compensated low speed value, the program proceeding to a point 108.

When the computer program proceeds to point 108, as previously described, the compensated low speed value obtained at point 107 is cancelled, and the predetermined low speed value is set to provide hysteresis in the electric control apparatus for preventing oscillation between the points 106 and 108 in the computer program. Then, at point 109, the binary signals respectively indicative of the selected in-car temperature and the instant in-car temperature are read out from RAM, and CPU discriminates as "no" because the instant in-car temperature is higher than the selected in-car temperature, the computer program proceeding to a point 113 through a point 112.

At this stage, it will be understood that the opening degree of the door 7 substantially becomes the zero value, as previously described. This means that there is no surplus cooling ability in the air conditioning system. When CPU discriminates as "no" on a basis of the above description, it proceeds the program to a point 118 through a point 117. Then, CPU produces a second control signal which is applied to the drive circuit 20. Subsequently, the drive circuit 20 produces an electric energization signal in response to the second control signal from computer 17 and, in turn, applies the same to the clutch 5a. Thus, the clutch 5a is energized to connect the compressor 5 to the engine, and the compressor 5 is driven to compress refrigerant gases which are circulated into the evaporator 4 as refrigerant liquid, as previously described. When the door switch 2 is switched-over to open the first inlet 1a and the blower 3 is driven by actuation of the blower switch, the air outside the automobile is taken into the air duct 1 and impelled by the blower 3 toward the evaporator 4. Then, the air is dehumidified and cooled in the evaporator 4 and directly supplied as the cooled air into the compartment 8. This means initiation of conditioning the in-car temperature in the compartment 8 toward the selected in-car temperature.

When the computer program proceeds to point 119, CPU calculates a value $T_B$ from the equation (3) in accordance with binary signals respectively indicative of in-car and ambient temperatures and door opening degree from RAM and the second to fourth temperature coefficients $K_2$, $K_3$, $K_4$. Thereafter, the computer program proceeds to points 120, 121, and the calculated value $T_B$ from CPU is applied to the actuator 19 as a third control signal. Thus, the actuator 19 is actuated such that displacement of the rod 19a is held to maintain the door opening degree in the zero value. After this operational mode, the above-noted execution in computer 17 is repetitively conducted to gradually lower the in-car temperature toward the selected temperature and also to control the door opening degree toward the predetermined door opening degree.

When the door opening degree exceeds the predetermined door opening degree during the above-noted repetitive execution, CPU discriminates as "yes" at point 113 and procees the computer program to a point 114. Then, a first control signal is produced from and applied by CPU to the drive circuit 20 to generate an electric deenergization signal from the drive circuit 20. Thus, the clutch 5a is deenergized to disconnect the compressor 5 from the engine.

When the computer program proceeds to a point 115, the predetermined door opening degree and the predetermined compensation door opening degree are respectively read out from ROM, the predetermined door opening degree is compensated such that it takes a smaller value by the predetermined compensation door opening degree. This provides hysteresis in the electric control apparatus for preventing oscillation between the points 114 and 117 in the computer program. The compensated door opening degree is memorized in RAM, and the program proceeds to points 116, 119. Then, values $M_F$, $T_A$ are respectively calculated by CPU, as previously described, the computer program proceeding to points 120, 121. When the calculated value $T_A$ from CPU is applied to the actuator 19 as a third control signal, the actuator 19 starts to control displacement of the rod 19a such that the door opening degree is decreased to maintain instant in-car temperature in the selected in-car temperature. After this operational mode, the above-noted execution in computer 17 is repetitively conducted to gradually decrease the door opening degree toward the compensated door opening degree to maintain the in-car temperature in the selected in-car temperature.

From the above description, it will be understood that while the air conditioning system provides surplus cooling ability, deactivation of the compressor 5 is held to avoid unnecessary dissipation of the engine output power.

When the door opening degree decreases below the compensated door opening degree memorized in RAM at point 115, the decreased door opening degree is detected by the door position sensor 10 and applied to the converter 16 as an electric signal. The electric signal from sensor 10 is converted by the converter 16 and applied as a binary signal to computer 17 at point 102 together with other binary signals from converter 16. Then, the binary signals are temporarily memorized in RAM. When the computer program proceeds to point 113, as previously described, CPU discriminates as "no" because the decreased door opening degree is below the compensated door opening degree, the computer program proceeding to point 117. Then, the compensated door opening degree is cancelled, and the predetermined opening degree is again memorized in RAM.

Thereafter, a second control signal is produced from CPU on a basis of the discriminated result at point 113 and is applied to the drive circuit 20 at point 118. When the drive circuit 20 produces an electric energization signal in response to the second control signal from computer 17, the clutch 5a is energized in response to the energization signal to connect the compressor to the engine so as to again activate the compressor 5. Thus, refrigerant gases are compressed by the compressor 5 and applied to the evaporator 4 as refrigerant liquid, as previously described. As a result, the air from the blower 3 is cooled through the evaporator 4 under activation of compressor 5.

When the computer program proceeds to point 119, a value $T_B$ is calculated by CPU, as previously described. The calculated value $T_B$ is applied to the actuator 19 as a third control signal at points 120, 121. Thus, the actuator 19 starts to control displacement of the rod 19a such that the door opening degree is changed toward the predetermined opening degree memorized in RAM at point 117.

Assuming that instant in-car temperature lowers below the selected temperature during the above repetitive execution, the in-car temperature is detected by the in-car sensor 9 and applied to the converter 16 as an electric signal. Then, the electric signal from sensor 9 is converted by the converter 16 together with other electric signals from sensors 9, 11 and selector 12 into binary signals. The binary signals from converter 16 are applied to and memorized in RAM at point 102. When the computer program proceeds to point 109, the binary signals respectively indicative of the lowered in-car temperature and the selected temperature are read out from RAM, and CPU discriminates as "yes" because the in-car temperature is lower than the selected temperature. When the computer program proceeds to a point 110, a first control signal is produced from CPU and applied to the drive circuit 20. Then, an electric deenergization signal is produced from the drive circuit 20 in response to the first control signal from computer 17 and is applied to the clutch 5a. Thus, the clutch 5a is deenergized to disconnect the compressor 5 from the engine.

When the program proceeds to a point 111, the selected temperature and the predetermined compensation temperature are respectively read out from RAM and ROM, and the selected temperature is compensated such that it takes a higher value by the predetermined compensation temperature. This provides hysteresis in the electric control apparatus for preventing oscillation between the points 110 and 112 in the computer program. The compensated selected temperature is memorized in RAM, and the program proceeds to points 116, 119. Then, values $M_F$, $T_A$ are respectively calculated by CPU, as previously described. Thereafter, at points 120, 121 the calculated value $T_A$ is produced from and applied by CPU to the actuator 19 as a third control signal. Thus, the actuator 19 starts to control displacement of the rod 19a so that the door opening degree $\theta$ is decreased to maintain the in-car temperature below the compensated selected temperature. From the above description, it will be noted that under deactivation of the compressor 5, the above-noted execution in computer 17 is repetitively conducted to gradually decrease the door opening degree until the in-car temperature reaches the compensated selected temperature obtained at point 111.

When the in-car temperature reaches the compensated selected temperature during the above-noted repetitive execution, CPU discriminates as "no" at point 109 and proceeds the program to point 112. Then, the compensated selected temperature is cancelled, and the selected temperature is again set to provide hysteresis for preventing oscillation in the electric control apparatus between points 110 and 112 in the computer program. If at this stage the door opening degree is smaller than the compensated door opening degree, CPU discriminates as "no" at point 113 and proceeds the program to point 117. Then, the compensated door opening degree is cancelled, and the predetermined door opening degree is again set to provide hysteresis for preventing oscillation in the electric control apparatus between points 114 and 117. When the computer program proceeds to point 118, a second control signal is produced from CPU and applied to the clutch 5a. Thus, the clutch 5a is energized to connect the compressor 5 to the engine.

When the program proceeds to point 119, a value $T_B$ is calculated by CPU, as previously described, and applied to the actuator 19 as a third control signal at points 120, 121. Thus, the actuator 19 starts to control displacement of the rod 19a so that the door opening degree is varied to lower the in-car temperature toward the selected temperature.

Although in the above embodiment the door position sensor 10 is utilized to discriminate the surplus cooling ability of the air conditioning system, it may be replaced with the in-car and ambient sensors 9, 11. In this case, the predetermined program stored in the computer 17 is modified such that the computer 17 discriminates the surplus cooling ability of the air conditioning system from a desired relationship among surplus cooling ability of the air conditioning system, temperature of air within the passenger compartment and temperature of air outside the automobile. The desired relationship described above is experimentally obtained in relation to the air conditioning system.

For practice of the present invention, the predetermined program stored in the computer 17 may be modified such that the computer 17 discriminates the fact that ambient temperature outside the automobile is lower than in-car temperature within the compartment 8 and produces a first control signal indicative of deactivation of the compressor 5. Furthermore, the predetermined program stored in the computer 17 may be modified such that the computer 17 discriminates the surplus cooling ability of the air conditioning system in consideration with the difference between in-car temperature within the compartment 8 and ambient temperature outside the automobile, and travel speed of the automobile. With this modification, unnecessary dissipation of the engine output power will be avoided more effectively.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for an automobile air conditioning system including an air duct for allowing the flow of air into a passenger compartment of the automobile, an evaporator connected with a refrigerant compressor and arranged within said air duct for cooling the air flowing therethrough, a heater arranged for warming a portion of the cooled air flowing from said evaporator into said compartment therethrough, an air-blend door arranged between said evaporator and said heater for controlling an amount of the cooled air flowing into said heater and controlling an amount of the cooled air directly flowing into said compartment, an electrically operated clutch mechanism for connecting said compressor to a prime mover of the automobile upon energization thereof and for disconnecting said compressor from said prime mover upon deenergization thereof, and an actuator arranged to control the setting of said air-blend door so as to adjust the actual temperature of air in said compartment and maintain it at a desired value, said control apparatus comprising:

first means for producing a first electric binary signal indicative of the actual temperature of air in said compartment;

second means for producing a second electric binary signal indicative of the actual temperature of air outside the automobile;

third means for producing a third electric binary signal indicative of the setting of said air-blend door;

a digital computer programmed to discriminate the setting of said air-blend door in relation to a predetermined value, the predetermined value being defined on a basis of a reference position of said air-blend door in which the cooled air from said evaporator is fully blocked from said heater, said computer producing a first control signal when a value of said third binary signal is above the predetermined value and a second control signal when a value of said third binary signal is below the predetermined value, said computer being further programmed to calculate a value indicative of optimum setting of said air-blend door maintaining the desired temperature of air in said compartment in relation to the actual temperatures of air in said compartment and outside the automobile, said computer producing a third control signal indicative of the calculated value to be applied to said actuator; and fourth means for deenergizing said clutch mechanism in response to said first control signal from said computer and for energizing said clutch mechanism in response to said second control signal from said computer.

2. An electric control apparatus as claimed in claim 1, wherein said computer is further programmed to compensate the predetermined value in a smaller value when a value of said third binary signal exceeds the predetermined value, said computer defining hysteresis based on the compensated value for preventing oscillation in operation thereof.

3. An electric control apparatus for an automobile air conditioning system including an air duct for allowing the flow of air into a passenger compartment of the automobile, an evaporator operatively connected with a refrigerant compressor and arranged within said air duct for cooling the air flowing therethrough, a heater arranged within said air duct for warming a portion of the cooled air flowing from said evaporator to said compartment therethrough, a control member arranged between said evaporator and said heater for selectively controlling the relative proportions of cooled air flowing to be warmed by said heater and of cooled air directly flowing into said compartment, an electrically operated clutch mechanism operable to connect said compressor to a prime mover of the automobile upon energization thereof and to disconnect said compressor from said prime mover upon deenergization thereof, and an actuator arranged to control the setting of said control member so as to adjust the actual temperature of air in said compartment, said control apparatus comprising:

first means for producing a first electric signal indicative of the actual temperature of air in said compartment;

second means for producing a second electric signal indicative of a desired temperature of air in said compartment;

third means for producing a third electric signal indicative of the setting of said control member;

fourth means for discriminating the setting of said control member in relation to a predetermined value, the predetermined value being defined on a basis of a reference position of said control member in which the cooled air from said evaporator is fully blocked from said heater, said fourth means producing a first control signal when a value of said third electric signal is above the predetermined value and a second control signal when a value of said third electric signal is below the predetermined value;

fifth means for providing an optimum value indicative of optimum position of said control member maintaining the desired temperature of air in said compartment in relation to the actual temperature of air in said compartment, said fifth means producing a third control signal indicative of the optimum value to be applied to said actuator; and sixth means for deenergizing said clutch mechanism in response to said first control signal from said fourth means and for energizing said clutch mechanism in response to said second control signal from said fourth means.

4. A method of controlling an automobile air conditioning system including an air duct for allowing the flow of air into a passenger compartment of the automobile, an evaporator operatively connected with a refrigerant compressor and arranged within said air duct for cooling the air flowing therethrough, a heater arranged within said air duct for warming a portion of the cooled air flowing from said evaporator into said compartment therethrough, an air-blend door arranged between said evaporator and said heater for controlling an amount of the cooled air flowing into said heater and controlling an amount of the cooled air directly flowing into said compartment, an electrically operated clutch mechanism operable to connect said compressor to a prime mover of the automobile upon energization thereof and to disconnect said compressor from said prime mover upon deenergization thereof, and an actuator for controlling the opening degree of said air-blend door to adjust and maintain the actual temperature of air in said compartment to a desired value, said method comprising the steps of:

producing a first electric binary signal indicative of the actual temperature of air in said compartment;

producing a second electric binary signal indicative of the actual temperature of air outside the automobile;

producing a third electric binary signal indicative of the opening degree of said air-blend door;

discriminating the opening degree of said air-blend door in relation to a predetermined value defined on a basis of a reference position of said air-blend door in which the cooled air from said evaporator is fully blocked from said heater, said discrimination being performed by a digital computer programmed to discriminate a value of said third binary signal in relation to the predetermined value;

producing a first control signal when a value of said third binary signal is above the predetermined value and producing a second control signal when a value of said third binary signal is below the predetermined value;

calculating a value indicative of optimum opening degree of said air-blend door maintaining the desired temperature of air in said compartment, said computer being further programmed to perform the calculation in relation to said first and second binary signals;

producing a third control signal indicative of the calculated value to be applied to said actuator; and deenergizing and energizing said clutch mechanism respectively in response to said first and second control signals.

* * * * *